United States Patent [19]

Perez et al.

[11] Patent Number: 5,139,126
[45] Date of Patent: Aug. 18, 1992

[54] CONTROL DEVICE FOR A CLUTCH, IN PARTICULAR FOR AN AUTOMOTIVE VEHICLE

[75] Inventors: Carlos L. Perez, Madrid; José F. F. de Mera, Mostoles-Madrid, both of Spain

[73] Assignee: Valeo, Paris, France

[21] Appl. No.: 658,306

[22] Filed: Feb. 20, 1991

[30] Foreign Application Priority Data

Feb. 23, 1990 [FR] France .................. 90 02247

[51] Int. Cl.⁵ .......................................... F16D 19/00
[52] U.S. Cl. ...................... 192/111 A; 192/99 A; 192/110 R
[58] Field of Search .......... 192/111 A, 110 R, 99 A, 192/89 A; 74/501.5; 188/2 D

[56] References Cited

U.S. PATENT DOCUMENTS

| 3,841,454 | 10/1974 | Pionte | 192/111 R |
|---|---|---|---|
| 4,344,518 | 8/1982 | Gilmore | 192/111 A |
| 4,378,713 | 4/1983 | Haskell | 74/501.5 |
| 4,464,951 | 8/1984 | Courbot | 74/501.5 R |
| 4,556,137 | 12/1985 | Abe | 192/111 A |
| 4,598,809 | 7/1986 | Glover et al. | 192/111 A |
| 4,784,245 | 11/1988 | Fabbro et al. | 192/111 A |
| 4,934,503 | 6/1990 | Bacher et al. | 192/93 A |
| 5,000,294 | 3/1991 | Hunnicutt et al. | 192/111 A X |

FOREIGN PATENT DOCUMENTS

| 0030494 | 6/1981 | European Pat. Off. . |
|---|---|---|
| 0067099 | 12/1982 | European Pat. Off. . |
| 0322265 | 6/1989 | European Pat. Off. . |
| 1587732 | 3/1970 | France . |
| 8913932 | 10/1989 | France . |
| 2210946 | 6/1989 | United Kingdom . |
| 2237350A | 5/1991 | United Kingdom . |

Primary Examiner—Leslie A. Braun
Assistant Examiner—Andrea Pitts
Attorney, Agent, or Firm—Longacre & White

[57] ABSTRACT

A clutch control device comprises a rotatable driving member to which one end of a traction cable is circumferentially attached, the traction cable having a coupling piece at its other end. The control device also includes a sleeve member which is in telescopic engagement with the coupling piece, with releasable locking means arranged between the sleeve member and the coupling piece. The sleeve member is arranged for connection to a control linkage, leading for example to a clutch pedal; and the control device also has a spring which urges the sleeve member towards the coupling piece. Any wear occurring upstream of the device, for example in the associated clutch, is automatically taken up due to the provision of resilient preloading means which tend to maintain the traction cable under tension and which act between the fixed support or housing member of the assembly and the coupling piece, which is thereby biassed towards the sleeve member.

6 Claims, 2 Drawing Sheets

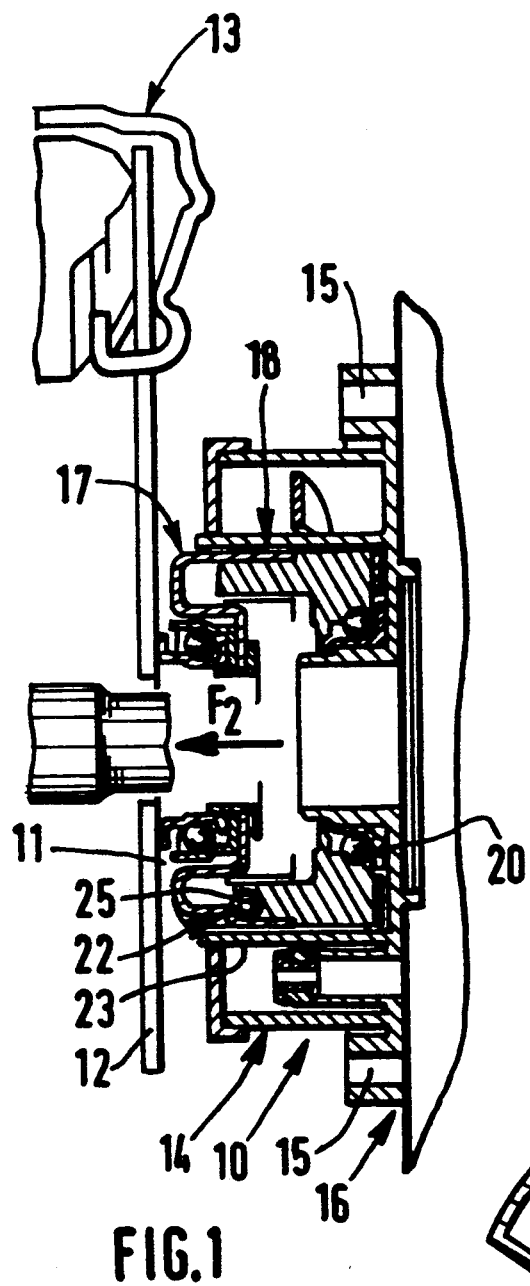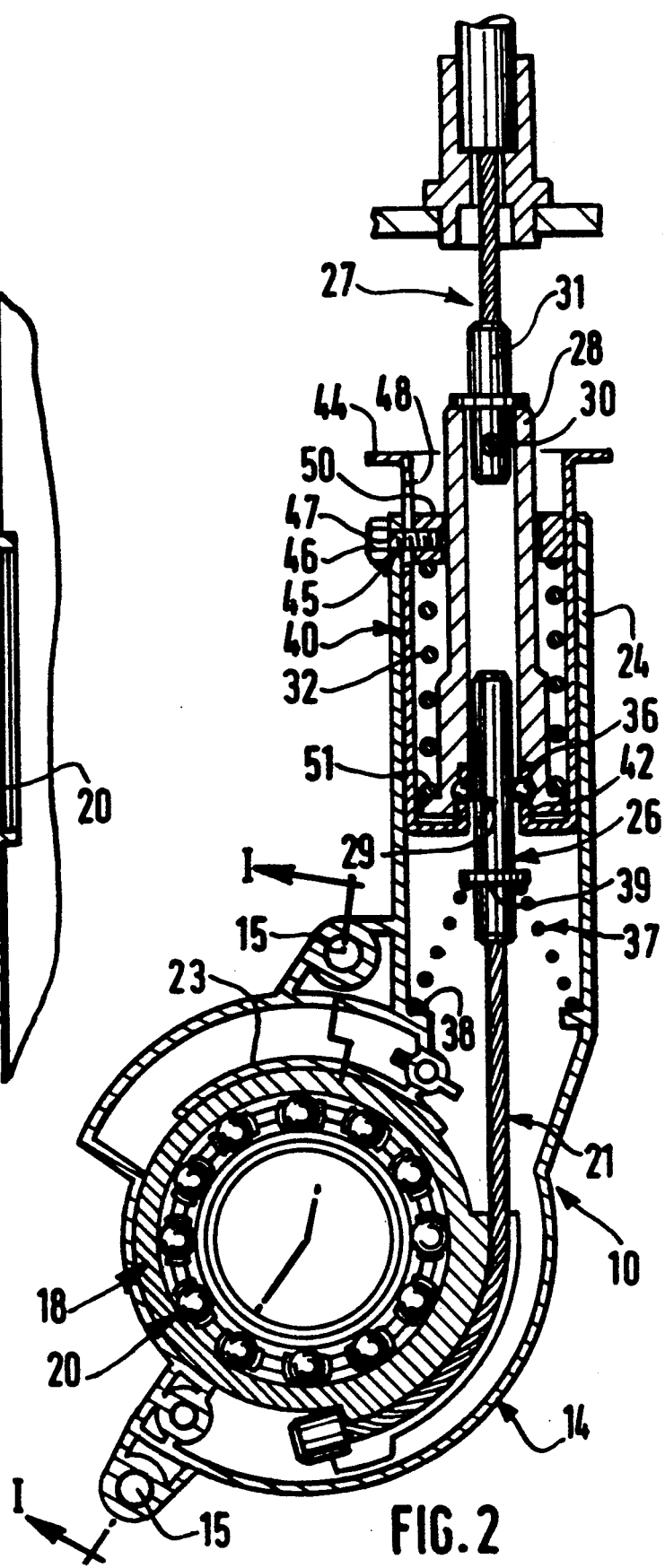
FIG.1
FIG.2

CONTROL DEVICE FOR A CLUTCH, IN PARTICULAR FOR AN AUTOMOTIVE VEHICLE

FIELD OF THE INVENTION

This invention relates to control devices for clutches, in particular for automotive vehicles; and in particular to clutch control devices which are intended for the acutuation of a clutch control member which is adapted to act on the declutching element of the clutch which is to be controlled, the control device comprising a support member which is adapted to be carried on a fixed structure such as the body or chassis of the vehicle; a driven member which is mounted in the said support member for translational movement with respect to the latter, and which carries the clutch control member; a driving member, which is mounted in the support member for rotational movement with respect to the latter, and to which a traction cable is circumferentially attached; and, arranged between the said driven member and the said driving member, camming means having complementary helical ramps.

BACKGROUND OF THE INVENTION

A control device of the kind described above is disclosed, in particular, in the specification of French published patent application No. FR 1 587 732A and the specification of European published patent application No. EP 0 322 265A.

The French patent application No. 89 13932 filed on Oct. 24, 1989 describes a control device of the above kind which further includes, for its connection to a control linkage which is under the control of the user, an intermediate sleeve member which is in telescopic engagement at one of its ends with a coupling piece that is provided at one end of the traction cable. Between the intermediate sleeve member and the coupling piece, a releasable locking means is operatively disposed. The other end of the intermediate sleeve member is adapted to be attached to the control linkage, and the device further includes resilient means which, being in engagement against the support member, urge the intermediate sleeve member towards the coupling piece.

DISCUSSION OF THE INVENTION

The present invention is directed to a clutch control device having the features mentioned above as having been disclosed in French patent application No. 89 13932. An object of the present invention is to provide such a control device in which additional advantage is taken of the telescopic engagement, associated with releasable locking means, between the intermediate sleeve member and the coupling piece.

The clutch control device in accordance with the invention is characterised in that, the traction cable being subjected to the action of resilient preloading means such as to tend to maintain the cable in tension, the resilient preloading means act between the support member and the coupling piece, and urge the coupling piece towards the intermediate sleeve member.

Thus, under the biassing action of the resilient preloading means, the coupling piece of the traction cable engages further and further into the intermediate sleeve member, thus ensuring its attachment to the control linkage regardless of the wear that may have taken place in the friction pads of the associated clutch. In other words, in a control device according to the invention, there is automatic compensation for such wear actually at the level at which the traction cable is coupled, without there being any necessity to provide for this purpose any other additional kind of device to take up wear, for example between the driving member and the driven member. The assembly is thus beneficially simplified.

The various features advantages of the invention will appear more clearly from the following description of a preferred embodiment of the invention, which is however given by way of example only, and with reference to the accompanying diagrammatic drawings.

BRIEF DESCRIPTION OF THE DRAWINGS

FIG. 1 is a view in axial cross section, taken on the section line indicated at I—I in FIG. 2 and showing a control device in accordance with the invention.

FIG. 2, which is on a larger scale, is a view in transverse cross section of the same device in its storage position (before being fitted to a machine such as a vehicle), the cross section being taken through the traction cable.

DESCRIPTION OF A PREFERRED EMBODIMENT OF THE INVENTION

Figure 3:
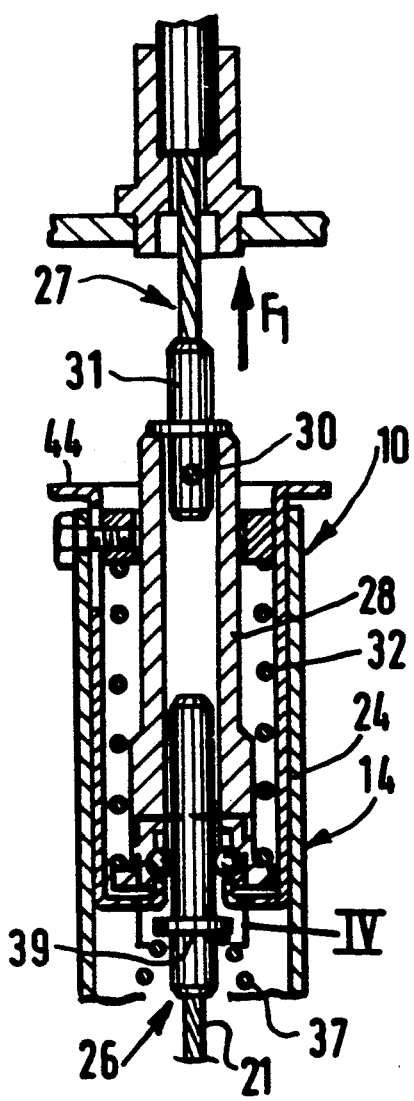
FIG. 3 is a view in transverse cross section which repeats part of FIG. 2, but illustrates the working position of the device and the means whereby wear is taken up.

The control device 10 shown in the drawings is of the same general type as that disclosed in French patent application No. 89 13932. The purpose of this control device is the actuation of a clutch release bearing 11, which constitutes a control member such as to act on the declutching element 12 of a clutch 13, FIG. 1. The declutching element 12 comprises the fingers of a diaphragm.

The control device 10 consists generally of a support 14, a driven member 17 and a driving member 18. The support 14 is adapted to be carried on a fixed member 16 by means of ears 15. The fixed member 16 is for example the casing of the associated gearbox. The driven member 17 is mounted for translational movement with respect to the support 14, while being fixed against rotation with respect to the latter. In this example the driven member 17 is so mounted by means of at least one tongue 19, and it acts on the control member 11. As to the driving member 18, this is mounted by means of a rolling bearing 20 for rotational movement with respect to the support 14, while being fixed against translational movement with respect to the latter. A traction cable 21 is attached circumferentially to the driven member 18, while camming means 22, having complementary helical ramps, are arranged between the driven member 17 and the driving member 18.

In this example, the driven member 17 and the driving member 18 extend within an annular portion 23 of the support 14, while the traction cable 21 extends along a projecting tubular portion 24 (which in this example is arranged vertically) of the support 14. A set of balls 25 is arranged between the helical ramps which constitute the camming means 22 and which are provided both on the driven member 17 and on the driving member 18.

As the above arrangements are not directly relevant to the present invention, they will not be described in any greater detail here. However, it should be noted that the driving member 18 comprises a rotary element, seen in FIG. 2, having a groove for accommodating the cable 21, with the end of the latter being provided with a retaining ferrule.

Inside the tubular portion 24 of the support 14, the other, or upper, end of the traction cable 21 carries a coupling piece 26 in the form of a shouldered pin. A control linkage 27, which in this example is coupled to the clutch pedal of the vehicle and which is controllable directly by the user, is coupled with the shouldered pin 26 through an intermediate sleeve member 28 which is part of the control device 10. The sleeve member 28 is in telescopic engagement at one of its ends with the coupling piece 26, and releasable locking means 29 are arranged between the sleeve member 28 and the coupling piece 26. The other, or upper, end of the sleeve member 28 is arranged to be coupled through a cotter pin 30 to an end piece 31 of the control linkage 27. Resilient means, which in this example comprise a compression spring 32, bear on the support 14 in a manner to be described below, and urge the intermediate sleeve member 28 towards the coupling piece 26.

Figure 4:
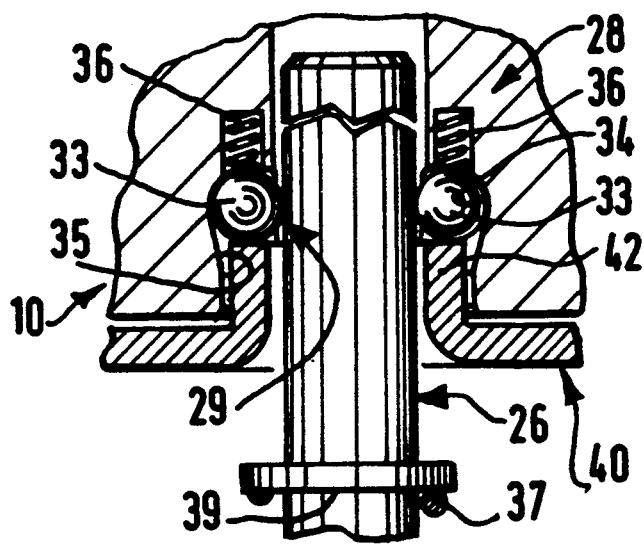
FIG. 4 repeats on a larger scale the detail of FIG. 3 which is indicated by the box IV in phantom lines in FIG. 3.

In this example the disengageable locking means 29 are in the form of a set of balls 33, FIG. 4, which are arranged in an annular array around the coupling piece 26 and in contact with it. The balls 33 are carried in a groove 34 formed in the intermediate sleeve member 28. The groove 34 is extended in a frusto conical surface 35 which is convergent towards the coupling piece 26. The balls 33 are loaded by springs 36 which urge them at all times towards the frusto conical convergent surface 35. The traction cable 21 is preloaded by means of a resilient preloading means 37, which is arranged between the support 14 and the coupling piece 26 so as to urge the coupling piece 26 towards the intermediate sleeve member 28. In this example the resilient preloading means comprises a frusto conical compression spring 37, engaging on the base of the tubular portion 24 of the support 14, between an internal shoulder 38 of the latter and the shoulder, 39, formed on the coupling piece 26.

The associated releasable locking means 29 are under the control of a sleeve 40 which is coaxial with the intermediate sleeve member 28 and which is accessible from outside the support 14. The sleeve 40 extends within the tubular portion 24 of the support 14, outside (i.e. surrounding) the intermediate sleeve member 28, and is mounted for sliding movement in the tubular portion 24 but with some friction. At its inner end the sleeve 40 has a tubular flange 42 which extends upwardly inside the sleeve member 28, so that the bottom end of the sleeve 40 contains the bottom end of the sleeve member 28, so that the sleeve 40 can act through the flange 42 on the disengageable locking means 29.

The sleeve 40 projects out of the tubular portion 24 of the support 14, and outside the latter it carries gripping means, which in this example comprise a radial flange 44. Between the sleeve 40 and the support 14, stop means 45 are provided. The latter here comprise a screw 46 which passes through a hole 47 in the tubular support portion 24, and thence through a passage in the form of an elongated slot formed through the wall of the sleeve 40. The screw 46 is finally screwed into a ring 50 which is disposed inside the sleeve 40. The spring 32 engages between this ring 50 and a shoulder 51 formed on the intermediate sleeve member 28.

In the storage condition of the control device, while it awaits fitting to the linkage 27, the end piece 31 is not raised, the sleeve 40 being held in its upper position by the screw 46, which clamps it between the ring 50 and the tubular support portion 24, as shown in FIG. 2. In this condition the spring 32 is then compressed, and urges the intermediate sleeve member 28 towards the coupling piece 26. The balls 33 of the releasable locking means 29 are held by the flange 42 of the sleeve 40, and are thus maintained in their groove 34, spaced away from the frusto conical convergent surface 35. This enables a free clearance to exist between the coupling piece 26 and the intermediate sleeve member 28.

On assembly, the end piece 31 of the control linkage 27 is engaged in the intermediate sleeve member 28 and secured to it by means of the cotter pin 30. The screw 46 is then loosened, which releases the sleeve 40 and therefore the intermediate sleeve member 28. Under the biasing effect of the spring 32, which is chosen so as to be able to overcome the friction between the sleeve 40 and the tubular support portion 24, the assembly moves further into the tubular portion 24, until the inevitable internal clearance in the control linkage 27 has been taken up. See FIG. 3. In association with this movement, the intermediate sleeve member 24 engages on the coupling piece 26 due to the fact that, as before and as shown in FIG. 4, the balls 33 of the releasable locking means 29 remain held in spaced relationship from the frusto conical surface 35, by the sleeve flange 42, while the traction cable 21 remains in tension under the biasing action of the spring 37.

When, in service, an upward pull is exerted by the control linkage 27 on the intermediate sleeve member 28, as indicated by the arrow F1 in FIG. 3, what happens is that, first, the intermediate sleeve member 28 carries out a slight disengaging movement in the same direction with respect to the coupling piece 26, while the sleeve 40 remains fixed because of the friction between it and the tubular support portion 24, even though the screw 46 has not been first retightened. Thus, under the biasing action of their springs 36, the balls 33 of the locking means 29 are released into contact with the frusto conical convergent surface 35.

Figure 5:
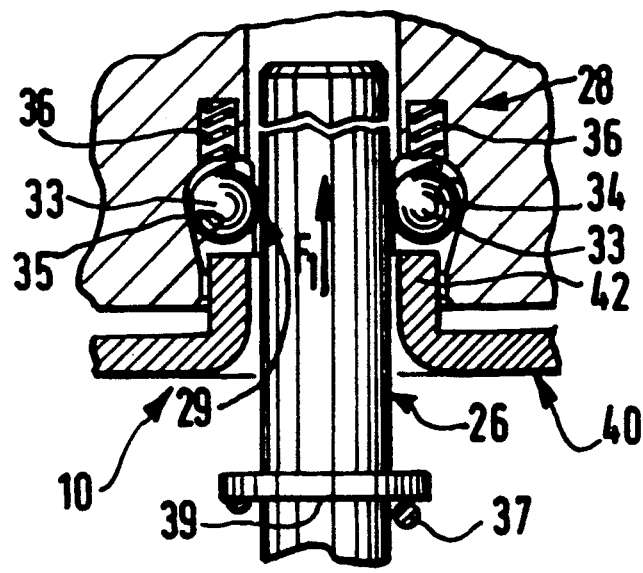
FIG. 5 is a view similar to that of FIG. 4, for the working and traction position.

It can be seen that the balls 33 act from then on as a wedge between the intermediate sleeve member 28 and the coupling piece 26, so that the latter then, in a second stage of the operation, becomes driven by the intermediate sleeve member 28, as indicated by the arrow F1 in FIG. 5. The driving member 28 then rotates, the driven member 17 becomes displaced axially as indicated by the arrow F2 in FIG. 1, and the declutching element 12 is actuated by the clutch release bearing 11. Finally, the clutch 13, which is normally in its engaged condition, with the friction pads on its friction disc gripped in known manner between the pressure plate and the reaction plate of the clutch, is thus put in a disengaged condition.

When the pull exerted by the control linkage 27 is released, the intermediate sleeve member 28 reverts to its initial position shown in FIGS. 3 and 4. The balls 33 of the releasable locking means 29 then leave a free axial clearance between the coupling piece 26 and the intermediate sleeve member 28, and the coupling piece 26 moves deeper into the intermediate sleeve member 28 under the influence of the spring 37 if, in the meantime, the friction pads of the clutch 13, being upstream of the spring 37, have been subjected to wear. In that way, automatic compensation for wear is inherent in the system.

In association with the above, the traction cable 21 remains in tension under the influence of the spring 37, which maintains the clutch release bearing 11 in contact with the declutching element 12.

If it is desired to disconnect the control linkage 27, all that is necessary is to loosen the screw 46 and to move the sleeve 40 upwards by gripping its flange 44.

The present invention is of course not limited to the embodiment described above and shown in the drawings, but embraces all possible embodiments. In particular, instead of the balls 33, the disengageable locking means which act between the coupling piece for the traction cable and the intermediate sleeve member, enabling it to be coupled to the control linkage by which actuation of the whole system is commanded, may employ ratchets as disclosed in French patent application No. 89 13932.

It will be appreciated that the driven member and the driving member can be modified within the scope of the present invention. Thus, the converse of FIG. 1 is possible in respect of the driving member 18, with the latter than comprising a central sleeve on which the driven member 17 is mounted with complementary ramps and balls acting between them. In that case, the driven member 17 incorporates an L-shaped actuating element with a correspondingly shaped sleeve to define the ramp means, and a rotatable flange portion having a finger or tab for cooperation with the tongue 19.

All of the above is made possible due to the fact that the resilient preloading means 37 act between the support 14 and the coupling piece 26.

What is claimed is:

1. For a clutch having a declutching element and a clutch control member for actuating said declutching element, a control device for actuating said clutch control member, comprising: a support member; a driven member carried by the support member for translational movement therein, said clutch control member being carried by the driven member; a driving member mounted in the support member for rotation therein; a traction cable circumferentially attached to the driving member; a coupling piece on a first end of the traction cable; camming means operatively disposed between said driven member and driving member and comprising complementary helical ramps; an intermediate sleeve member having a first end and a second end, its first end being in telescopic engagement with said coupling piece and its second end having means for coupling the intermediate sleeve member with an external control linkage; releasable locking means operatively disposed between the intermediate sleeve member and said coupling piece; and resilient means disposed between and in engagement with the intermediate sleeve member and the support member, such as to urge the intermediate sleeve member towards said coupling piece, wherein the control device further comprises resilient preloading means operatively disposed between the support member and the coupling piece for maintaining the traction cable in tension and for urging said coupling piece towards the intermediate sleeve member.

2. A control device according to claim 1, wherein the support member has a first shoulder and said coupling piece has a second shoulder, said first and second shoulders being in generally facing relationship with each other, and the resilient preloading means being arranged between and in engagement with said first and second shoulders.

3. A control device according to claim 1, wherein the resilient preloading means comprises a compression spring.

4. A control device according to claim 1, further comprising a sleeve coaxial with said intermediate sleeve member and mounted in the support member so as to protrude from the latter, whereby to be accessible from outside the support member, said sleeve surrounding the intermediate sleeve member and having an end portion within the support member, said end portion including a flange directed into said first end of the intermediate sleeve member, such as to act on the said releasable locking means disposed between the coupling piece and the intermediate sleeve member.

5. A control device according to claim 4, further including stop means operatively disposed between said sleeve and the support member.

6. A control device according to claim 5, wherein the support member includes a tubular portion, said sleeve being mounted for sliding movement with friction in said tubular portion, and said stop means comprising a ring disposed within said sleeve and a screw extending through the said tubular portion of the support member and through said sleeve to cooperate with said ring.

* * * * *